US011888648B1

(12) United States Patent
Lu et al.

(10) Patent No.: US 11,888,648 B1
(45) Date of Patent: Jan. 30, 2024

(54) SOFTWARE-ENABLED ACCESS POINT (SOFTAP) BASED BRIDGING OF DEVICES IN TWO WIRELESS NETWORKS

(71) Applicant: Amazon Technologies, Inc., Seattle, WA (US)

(72) Inventors: Jian Lu, Los Gatos, CA (US); QingYun Wei, San Jose, CA (US); Shao-Cheng Wang, Santa Clara, CA (US); Avinash Joshi, San Jose, CA (US); Zhen Xie, San Jose, CA (US); Ankita Rajeev Chandrachud, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/956,369

(22) Filed: Sep. 29, 2022

(51) Int. Cl.
H04L 12/46 (2006.01)
H04L 45/00 (2022.01)
H04L 61/103 (2022.01)
H04L 101/622 (2022.01)
H04L 101/659 (2022.01)

(52) U.S. Cl.
CPC .......... *H04L 12/4625* (2013.01); *H04L 45/66* (2013.01); *H04L 61/103* (2013.01); *H04L 2101/622* (2022.05); *H04L 2101/659* (2022.05)

(58) Field of Classification Search
CPC ........... H04L 12/4625; H04L 2101/622; H04L 2101/659; H04L 45/66; H04L 61/103
USPC .......................................................... 709/224
See application file for complete search history.

(56) References Cited

U.S. PATENT DOCUMENTS

| 10,630,543 | B1 * | 4/2020 | Wei ......................... H04W 4/70 |
| 11,470,541 | B2 * | 10/2022 | Nathanson .............. H04W 4/48 |
| 2005/0135261 | A1 * | 6/2005 | Lee ........................ H04L 1/0072 370/241 |
| 2012/0236864 | A1 * | 9/2012 | Zheng ................... H04L 69/167 370/392 |
| 2014/0003373 | A1 * | 1/2014 | Hakola .................. H04L 69/30 370/328 |
| 2016/0321211 | A1 * | 11/2016 | Zarcone ................ G06F 15/167 |

(Continued)

FOREIGN PATENT DOCUMENTS

| CN | 101656634 A | * | 2/2010 | |
| CN | 114938308 A | * | 8/2022 | |
| EP | 2362610 A1 | * | 8/2011 | ....... H04L 29/12264 |

OTHER PUBLICATIONS

English machine-translation of CN-114938308-A, pp. 1-13 (2022) (Year: 2022).*

(Continued)

*Primary Examiner* — David P Zarka
(74) *Attorney, Agent, or Firm* — Lowenstein Sandler LLP

(57) ABSTRACT

A softAP bridge is created to support a mesh network that also works seamlessly with any home Wi-Fi AP routers by using Layer-3 techniques to simulate a Layer-2 bridge. With this softAP bridge, Wi-Fi chipsets with integrated special Wi-Fi MAC Layer-2 mesh network support (e.g., 802.11s), or external gateway hubs, are not required. To accomplish this solution, one of the wireless devices may be designated as a relay device for communicating IPv6 data packets between a home AP router and the remaining wireless devices designated as client devices.

19 Claims, 8 Drawing Sheets

(56) References Cited

U.S. PATENT DOCUMENTS

2020/0186490 A1* 6/2020 Bhaskaran .............. H04L 61/58
2021/0377170 A1* 12/2021 Lee ......................... H04L 45/02

OTHER PUBLICATIONS

English machine-translation of CN-101656634-A, pp. 1-15 (2010) (Year: 2010).*
RFC 4862, IPv6 Stateless Address Autoconfiguration, pp. 1-30 (Sep. 2007) (Year: 2007).*

* cited by examiner

SOFTWARE-ENABLED ACCESS POINT (SOFTAP) BASED BRIDGING OF DEVICES IN TWO WIRELESS NETWORKS

BACKGROUND

With the advancements in wireless communication technology, internetworking a number of wireless devices to define a mesh network is now achievable to accomplish previously unavailable features. This internetworking of devices has been referred to generally as the Internet of Things (IoT). An IoT network of wireless devices may communicate over, for example, Wi-Fi® technology.

However, a common problem encountered when using Wi-Fi technology to sustain an IoT network is the physical range limitations in Wi-Fi signal coverage by a single Wi-Fi Access Point (AP). In other words, a single Wi-Fi AP device may not support the range to cover all desired IoT devices to be included in the IoT network when the IoT devices are physically located beyond the range of the single Wi-Fi AP device.

Software-Enabled Access Point (SoftAP) is a common feature in some Wi-Fi chipsets for wireless devices. SoftAP allows a wireless device to host its own Wi-Fi network and act as a bridge, to which other wireless devices can connect.

DESCRIPTION OF THE FIGURES

The present embodiments will be understood more fully from the detailed description given below and from the accompanying drawings of the present disclosure, which, however, cannot be taken to limit the present embodiments, but are for explanation and understanding only.

DETAILED DESCRIPTION

Figure 1:
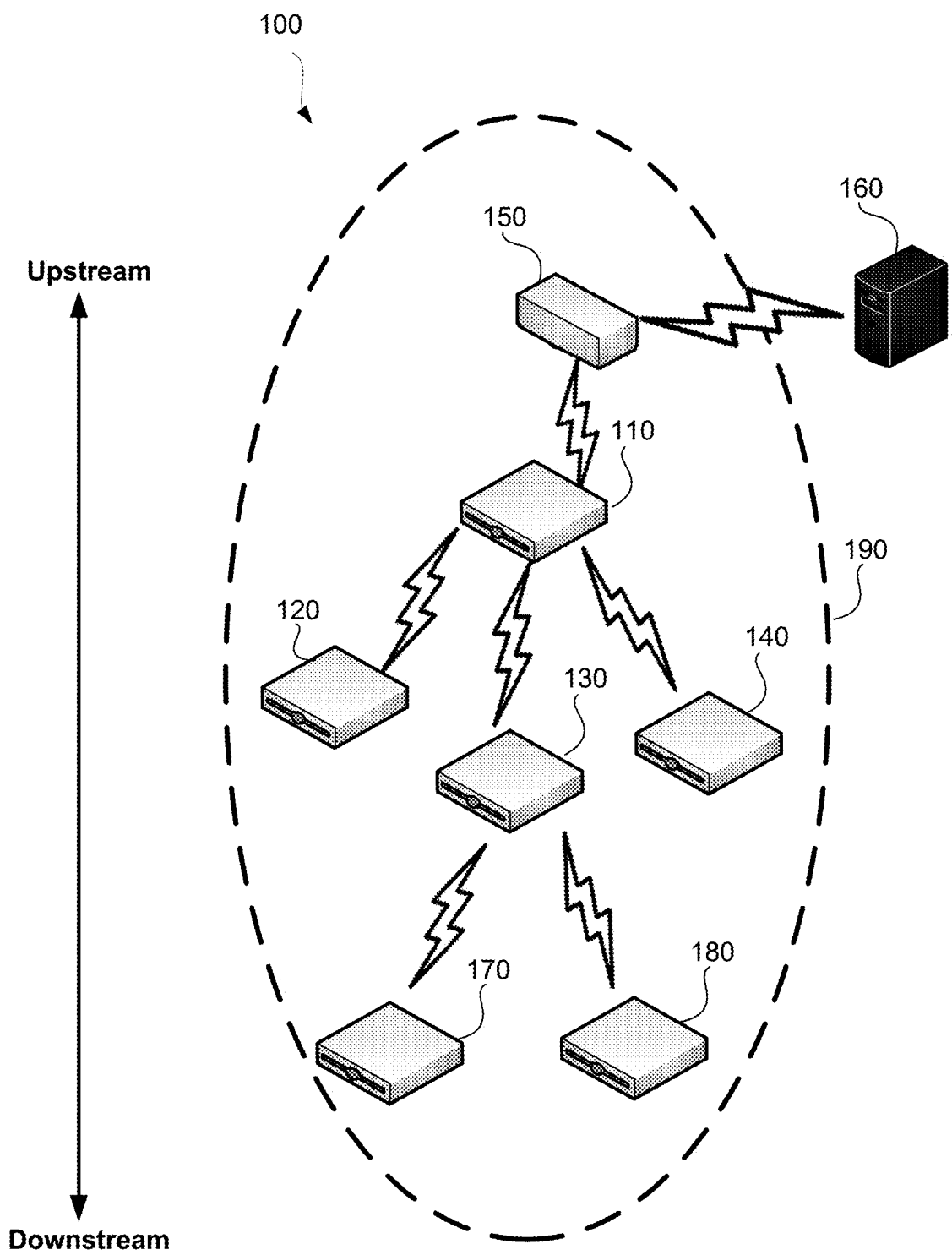
FIG. 1 shows an exemplary mesh network system arranged in a tree mesh architecture, according to one embodiment.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It follows that within the context of wireless communication technology for creating a network of wireless devices, there exists a need to extend the wireless range of the network beyond the Wi-Fi signal range of a Wi-Fi AP. As a result, networks can be created to provide connection to wireless devices positioned over a broader physical area than the physical area covered by the Wi-Fi signal range of the Wi-Fi AP.

To extend the Wi-Fi signal range of a Wi-Fi AP to cover a broader physical area than the physical area covered by the Wi-Fi signal range of the Wi-Fi AP, a solution for creating a mesh network by utilizing wireless devices in combination with the Wi-Fi AP is presented by this disclosure. By utilizing the wireless devices themselves to form the mesh network, the resulting mesh network breaks past the Wi-Fi AP's range boundary. The wireless devices described herein may include smartphones, tablet computers, laptop computers, desktop computers, home automation devices, or other smart computing devices that include wireless communication circuitry (e.g., Wi-Fi chip hardware).

Currently, there exists a standard (IEEE 802.11s) that defines a Wi-Fi MAC layer (OSI Layer-2) for establishing mesh network protocols to create such a mesh network between wireless devices. However, the complexity of the 802.11s protocol makes it prohibitive for its adoption into legacy Wi-Fi chipsets installed on most wireless devices. Due to legacy Wi-Fi chipsets often not being manufactured with the 802.11s protocol enabled, wireless devices including such legacy Wi-Fi chipsets are without a convenient preinstalled solution for creating a mesh network with other wireless devices with similar legacy Wi-Fi chipsets that are not enabled to implement the 802.11s protocol.

In view of the 802.11s protocol failing to be installed onto most legacy Wi-Fi chipsets, an innovative network architecture is proposed by this disclosure to help implement a Wi-Fi mesh network using the available Wi-Fi protocols on legacy Wi-Fi chipsets. This technical solution is available on wireless devices that support simultaneous Wi-Fi client STA (station) and p2p-GO (p2p group owner) interfaces, which are known to be available on even the most basic (i.e., cheap) Wi-Fi chipsets.

In this disclosure, the proposed mesh network creating solution looks to operate in an IP layer (network Layer-3 by ISO OSI model's seven-layer networking definition) to simulate a MAC layer (data link Layer-2) mesh network. Thus the proposed solution creates a softAP bridge to support a mesh network and work seamlessly with any home Wi-Fi AP routers by using Layer-3 techniques to simulate a Layer-2 bridge. With this softAP bridge, Wi-Fi chipsets with integrated special Wi-Fi MAC Layer-2 mesh network support (e.g., 802.11s), or external gateway hubs, are not required. To provide a mesh network, one of the wireless devices may be designated as a primary device that communicates with a home AP router and also operates as a relay to the remaining client wireless devices (client devices/nodes). Each of the wireless devices (primary device, client device) may be a station device with the capability to use certain known Wi-Fi protocols such as 802.11. The technical solution also achieves the softAP bridge by creating two networks within the same IP sub-network to achieve a "zero-configuration" for an end-user of the mesh network where the primary device is otherwise transparent between the client devices and the home AP router. The client device does not have Internet Protocol version 6 (IPv6) compatibility, and the two networks include a first physical network between the primary device and the home AP router, and a second physical network between the primary device and its client devices.

FIG. 1 shows an exemplary mesh network system 100 arranged in a tree mesh architecture 190. The mesh network system 100 includes a plurality of wireless devices such as a client node device 120, a client node device 130, a client node device 140, a client node device 170, a client node device 180, which may or may not have Internet Protocol version 6 (IPv6) compatibility, and a relay node device 110 (may also be referred to as a primary node device 110). Each of the client node device 120, the client node device 130, the client node device 140, the client node device 170, the client node device 180, and the relay node device 110 may be the same or similar types of wireless devices, such as a smartphone, a tablet computer, a laptop computer, a desktop computer, a home automation device, or other smart computing devices enabled for wireless capabilities. The mesh network system 100 also includes a home AP router 150, where the home AP router 150 may further communicate with another wireless device 160 that is not necessarily part of the tree mesh architecture 190. Within the mesh network system 100, the home AP router 150 also serves as a dynamic host configuration protocol (DHCP) server for assigning IP addresses to devices connected to the mesh network system 100.

The tree mesh architecture 190 is characterized by utilizing certain node device devices as relay devices that bridge communication between upstream parent node device devices and downstream child node device devices to enable communication between the parent and child node device devices. For example, the relay node device 110 operates to bridge communication between the child nodes (the client node device 120, the client node device 130, and the client node device 140) and the upstream home AP router 150.

The tree mesh architecture 190 further supports multiple relay devices bridged together in a daisy-chain configuration. For example, a daisy-chain configuration includes the client node device 170, the client node device 130, the relay node device 110, and the home AP router 150, as shown in FIG. 1. In this daisy chain configuration, the relay node device 110 operates as a first level relay device and the client node device 130 operates as a second level relay device. So a request communication transmitted by the client node device 170 (or the client node device 180) is received by the client node device 130 operating as the second level relay device, and the client node device 130 relays the request communication upstream to the relay node device 110 operating as the first level relay device. The relay node device 110 receives the request communication from the client node device 130, and the relay node device 110 relays the request communication upstream to the home AP router 150. After receiving the request communication, the home AP router 150 generates a response communication and transmits the response communication. The relay node device 110 operating as the first level relay device, receives the response communication from the home AP router 150, and the relay node device 110 relays the response communication downstream to the client node device 130. The client node device 130, operating as the second level relay device, receives the response communication from the relay node device 110, and the client node device 130 relays the response communication downstream to the client node device 170 (or the client node device 180, whichever transmitted the request communication). This daisy-chain configuration is also extendable for additional layers of node device devices, which in turn results in additional layers of node device devices operating as relay devices. For each wireless device within the tree mesh architecture 190 that operates as a relay device (e.g., the relay node device 110) bridging communication between a downstream child node device and an upstream parent node, including when the client nodes are connected in the daisy-chain configuration, the features described below that are attributable to the relay node device 110 to achieve the virtual bridging (softAP bridge) capabilities may apply. The relay node device 110 is configured to receive a network configuration request from the client node device 180, enter, into a transaction table stored on the memory, a host entry including the client device ID as the lookup key and enter the network configuration request as a corresponding request ID. The relay node device 110 is further configured to turn on a dynamic host configuration protocol (DHCP) broadcast flag or turn on a DHCP relay agent field in the network configuration request, and send the network configuration request to the network router 150. The relay node device 110 is further configured to receive a network configuration response from the network router 150, the network configuration response including a client address assigned to the client node device 180 by the network router 150, retrieve the client device ID from the transaction table, and send the network configuration response to the client node device 180 based on the client device ID. The network configuration response may include at least a default gateway information including the network router or an application network layer server device ID.

By updating the source MAC address in the DHCP request to identify the relay node device 110 and not the client node device 130 requesting the IP address assignment, the relay node device 110 ensures the home AP router 150 will transmit a response back to the relay node device 110. The relay node device 110 further creates a new entry into a transaction table stored on a memory of the relay node device 110 for tracking which wireless capable device has submitted the DHCP request. The transaction table may be a lookup table where each entry is comprised of a lookup key identifying a device ID for a wireless capable device that submitted a DHCP request and a corresponding request ID identifying the DHCP request. The request ID may also be a transaction ID for identifying a message request and response transaction.

So by using the device ID to look up an entry in the transaction table, the relay node device 110 is able to match the specific DHCP request to the wireless capable device having submitted the DHCP request. Here, the transaction table stored by the relay node device 110 identifies the client node device 130 as the device submitting the DHCP request by creating a new entry comprised of the client node device's 130 device ID (MAC address) as the lookup key and a matching request ID that corresponds to the DHCP request submitted by the client node device 130. The relay node device 110 may reference this transaction table to later identify the proper client node device 130 to relay a DHCP response to. The transaction table may include one or more entries for each client node device (e.g., client node device 120, client node device 130, client node device 140) the relay node device 110 operates as a virtual bridge for. Although the lookup key is described as being the device ID, according to other embodiments the request ID may be referenced as the lookup key to the transaction table.

After the relay node device 110 learns the IP address and the MAC address for the home AP router 150 with relation to the upstream interface (relay node device wlan0), the relay node device 110 creates an entry into an internal host record hash table identifying the device ID of the home AP router 150 (e.g., MAC address) and a corresponding entry describing the device network address for the home AP router 150 (e.g., IP address). The internal host record hash table may be stored within a memory of the relay node device 110 as either part of, or distinct from, the transaction table. In addition to the identifying information on the home AP router, the internal host record hash table may include identifying information identify a host's device ID and/or network address. For example, the internal host record hash table may identify the relay node device 110 as a host device by identifying the device ID and network address for the upstream interface and downstream interface of the relay node device 110. The internal host record hash table may use a network address as the lookup key for looking up entry records stored in the internal host record hash table.

The relay node device 110 receives the DHCP response from the home AP router 150 through the relay node device's 110 upstream interface (relay node device wlan0) based on the identification of the relay node device 110 as the destination MAC address. The relay node device 110 then relays the DHCP response to the client node device 130 based on the DHCP requesting client identification which identifies the client node device 130. In addition or alternatively, the relay node device 110 may identify the client node device 130 as the proper device to relay the DHCP response by referencing the transaction table and looking up the client node device 130 based on the client node device's 130 device ID as a lookup key. By using the client node device's 130 device ID as the lookup key to the transaction table, the relay node device 110 locates the matching request ID and determines the client node device 130 to be the device that initially requested the IP address in the DHCP request submitted by the client node device 130, and therefore the present DHCP request belongs to the same message transaction. Either way, the relay node device 110 is able to identify the client node device 130 and relay the DHCP response to the client node device 130 accordingly. The DHCP response is relayed to the client node device 130 through the relay node device's 110 downstream interface (relay node device wlan1) and via the second physical network.

The relay node device 110 further generates a transaction table describing communications (e.g., requests, replies, inquires, and answers) relayed through the relay node device 110 and attributes of component devices within the mesh network system. The transaction table may be maintained to keep track of locations and roles taken on by component devices within the mesh network system 100. For example, the transaction table may be representative of the internal host record hash table and/or DHCP request transaction hash table generated and maintained by the relay node device 110.

After generating the transaction table, the relay node device 110 stores a request client entry into the transaction table. The request client entry identifies the client node device 130 that submitted the network configuration request, and uses the device ID of the client node device 130 as a lookup key to the transaction table for looking up the request client entry when later relaying a response message back to the client node device 130. The device ID may be, for example, a MAC address of the client node device 130 that is identified within the network configuration request. The request client entry may include the lookup key and a corresponding request ID that identifies the network configuration request submitted by the client node device 130.

Figure 2:
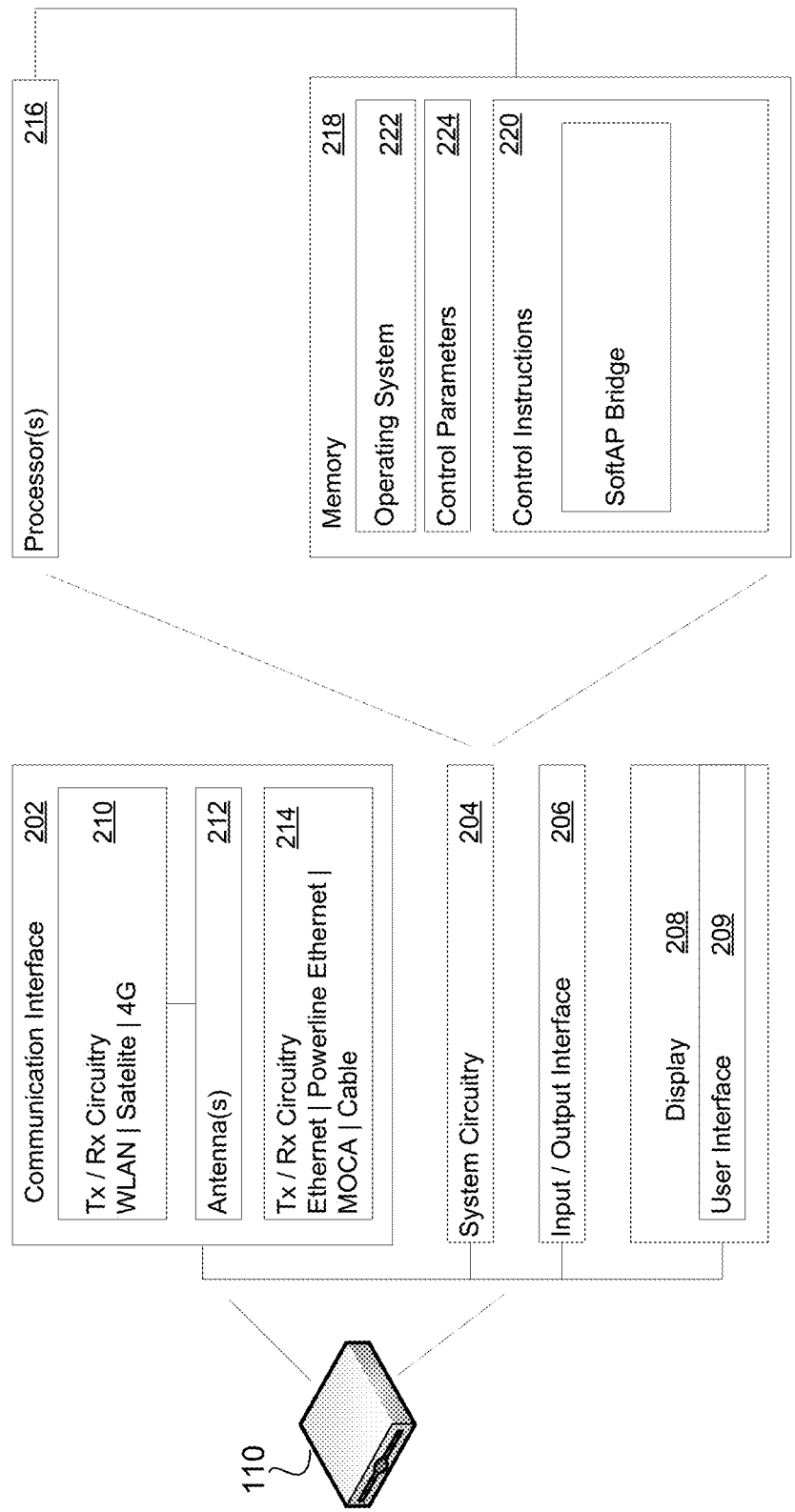
FIG. 2 shows an exemplary computer architecture of a computing device included in the mesh network system shown in FIG. 1, according to one embodiment.

FIG. 2 shows a computer architecture for the relay node device 110 included in the mesh network system 100 shown in FIG. 1. Although the relay node device 110 is depicted in FIG. 2, some, or all, of the same components described within the computer architecture of the relay node device 110 as shown in FIG. 2 may also be applicable to the computer architecture of the other computing devices included in the mesh network system 100.

The computer architecture of the relay node device 110 includes a communication interface 202 (e.g., an upstream interface and a downstream interface of the relay node device 110), a system circuitry 204, an input/output interface 206, and a display 208 on which a user interface 209 may be generated for interacting with a user of the relay node device 110. The upstream interface and the downstream interface described as being included in the relay node device 110 may be virtual interfaces operated through the same physical communication interface 202.

The user interface 209 and the input/output interface 206 may include a graphical user interface (GUI), touch-sensitive display, voice or facial recognition inputs, buttons, switches, speakers, microphones, and other user interface elements. Additional examples of the input/output interface 206 include, without limitation, microphones, video and still image cameras, headset and microphone input/output jacks, Universal Serial Bus (USB) connectors, memory card slots, and other types of inputs. The input/output interface 206 may further include magnetic or optical media interfaces (e.g., a CDROM or DVD drive), serial and parallel bus interfaces, and keyboard and mouse interfaces. According to some embodiments, the user interface 209 may prompt a user to input data through the input/output interface 206. The user inputs through the input/output interface 206 may then be stored on the memory 218.

The communication interface 202 may include wireless transmitters and receivers ("transceivers") 210 and any antennas 212 used by the Tx/Rx circuitry of the transceivers 210. The transceivers 210 and the antennas 212 may be part of a Wi-Fi chipset for supporting Wi-Fi network communications under, for instance, any version of IEEE 802.11, e.g., 802.11n or 802.11ac. The communication interface 202 may also include wireline transceivers 214. The transceivers 214 may provide physical layer interfaces for any of a wide range of communication protocols, such as any type of Ethernet, data over cable service interface specification (DOCSIS), powerline Ethernet, multimedia over coax alliance (MOCA), multicast domain name system (mDNS), universal plug and play (UPnP), internet protocol television (IPTV), or other protocol. The communication interface 202 may further be representative of Wi-Fi interfaces such as an upstream interface for communicating with wireless devices that are upstream to the relay node device 110 within the tree mesh architecture 190, and a downstream interface for communicating with wireless devices that are downstream from the relay node device 110 within the tree mesh architecture 190. Through control of these different interfaces, the processes for controlling the operation of the relay node device 110 for creating the softAP bridge is applicable to implement other application layer gateway functions across any supportable communication protocol (either wired or wireless).

The system circuitry 204 may include any combination of hardware, software, middleware, circuitry, firmware, or other logic. The system circuitry 204 may be implemented, for example, with one or more systems on a chip (SoC), application-specific integrated circuits (ASIC), microprocessors, discrete analog, digital circuits, and other circuitry.

The system circuitry 204 may be part of the implementation of any desired functionality in the operation of the relay node device 110. As just one example, the system circuitry 204 may include one or more processors 216 and memory 218. The memory 218 stores, for example, control instructions 220 for implementing the softAP bridge on the relay node device 110, as well as instructions for an operating system 222 running on the relay node device 110. The processors 216 may execute the control instructions 220 and the operating system 222 to perform any desired functionality for the relay node device 110. Control parameters 224 may provide and specify configuration and operating options for the control instructions 220, operating system 222, and other functionality of the relay node device 110. The application server may also include storage devices (e.g., hard disk drives (HDDs) and solid state disk drives (SSDs)), as represented by the memory 218.

Figure 3:
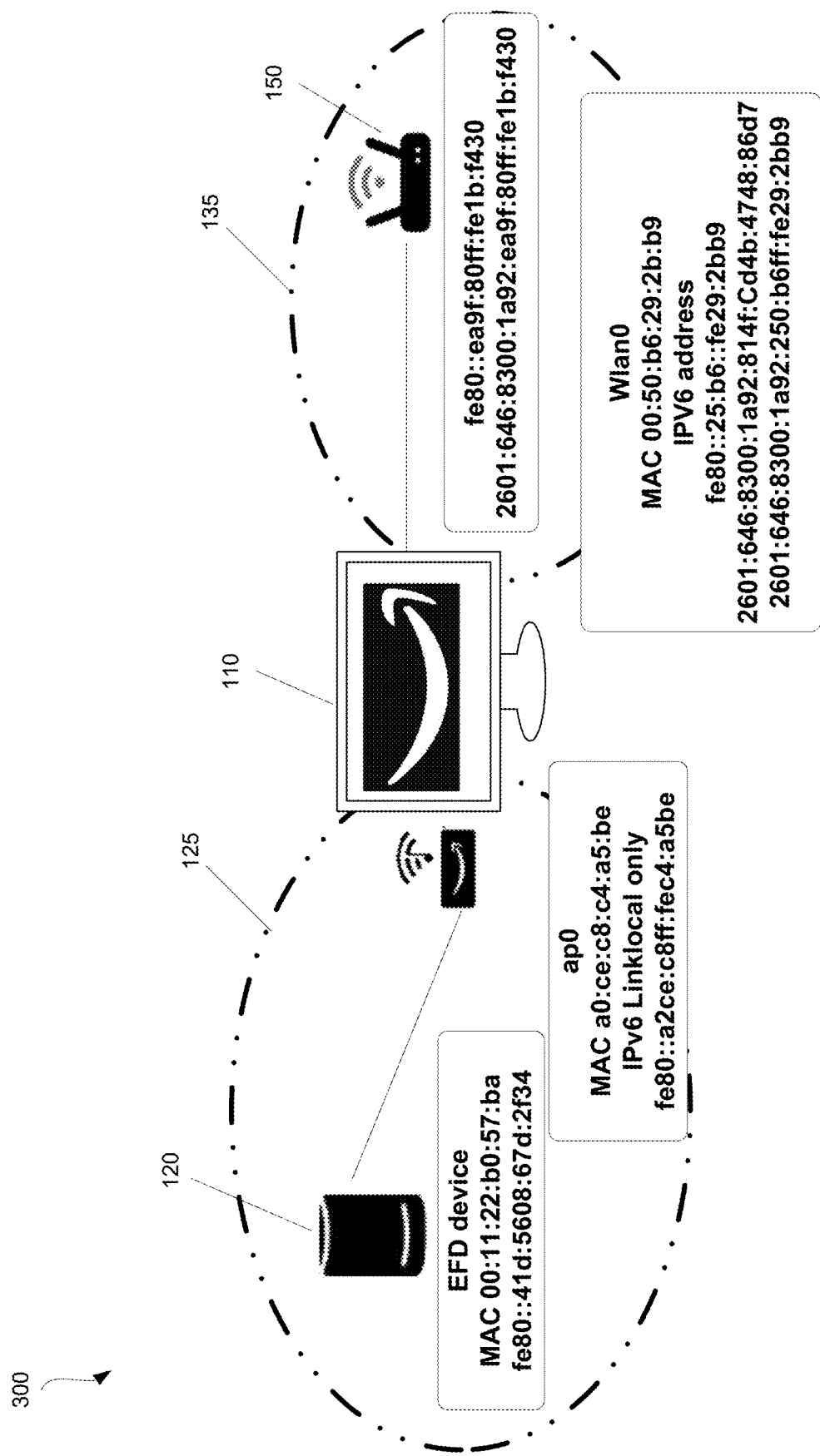
FIG. 3 shows a partial view of the mesh network system shown in FIG. 1 and corresponding device identification information assigned to the component devices, according to one embodiment.

FIG. 3 shows a partial view 300 of the mesh network system 100 shown in FIG. 1, including the relay node device 110, the client node device 130, and the home AP router 150. FIG. 3 also identifies exemplary device network addresses (e.g., IP addresses) and device identification or identifier (e.g., MAC addresses) assigned to the component devices within the mesh network system 100. The device network addresses and device identification may more generally be referred to as an identifier. In this partial view 300, included is a home basic service set (BSS) 135 that includes the network router 150 and the relay node device 100, and a softAP basic service set (BSS) 125 that includes the relay node device 110 and one or more client nodes 130. In this embodiment, the relay node device 110 supports "Matter" for local connectivity and control. Matter is an open standard for smart home technology that lets a wireless device work with any Matter-certified ecosystem using a single protocol. Matter originates from the Connectivity Standards Alliance, an organization of hundreds of companies creating products for the smart home. Matter provides lower latency and higher reliability than a cloud-to-cloud connection because Matter is an IP-based local connectivity protocol. Matter is implemented by an open source SDK that contains not only the implementation of the specification but also a set of examples and interoperable code. The core Matter protocol fits on the top three layers in the context of OSI, meaning it can run over any type of IPv6 transport and network. While control and other operational communication are performed over IPv6, Bluetooth Low Energy (BLE) may be employed to commission new devices. Matter also supports bridging other smart home technologies such as Zigbee, Bluetooth Mesh, and Z-Wave. This means that devices based on these protocols may operate as if they were Matter devices through a bridge, which is a member device of a Matter network and the other bridged IoT technologies.

In this embodiment, relay node device 110 relays IPv6 packets received from the home AP router 150 to the client node device 130 using the mesh architecture 190 described in FIG. 1. The relay node device 110 maintains a list of addresses together with their corresponding lifetimes. The address list contains both autoconfigured addresses and those configured manually. The relay node device 110 forms a link-local address whenever an interface becomes enabled. An interface may become enabled after any of the following events: The interface is initialized at system startup time. The interface is reinitialized after a temporary interface failure or after being temporarily disabled by system management. The interface attaches to a link for the first time. This includes the case where the attached link is dynamically changed due to a change of the access point of wireless networks.

The interface becomes enabled by system management after having been administratively disabled. A link-local address is formed by combining the well-known link-local prefix FE80::0 (of appropriate length) with an interface identifier as follows: 1) The left-most 'prefix length' bits of the address are those of the link-local prefix; 2) The bits in the address to the right of the link-local prefix are set to all zeroes; 3) If the length of the interface identifier is N bits, the right-most N bits of the address are replaced by the interface identifier. If the sum of the link-local prefix length and N is larger than 128, autoconfiguration fails, and manual configuration is required. The length of the interface identifier is defined in a separate link-type-specific document, which can also be consistent with the address architecture. A link-local address has an infinite preferred and valid lifetime and is never timed out.

Autoconfiguration is performed on a per-interface basis on multicast-capable interfaces. For some hosts (e.g., relay node device 110), autoconfiguration is performed independently on each interface. Autoconfiguration applies primarily to hosts, with two exceptions. Routers are expected to generate a link-local address using the procedure. In addition, routers perform Duplicate Address Detection on all addresses prior to assigning them to an interface. A node device (e.g., any wireless device that implements IP, such as a relay device) can allow the following autoconfiguration-related variable to be configured by system management for each multicast-capable interface. DupAddrDetectTransmits is the number of consecutive Neighbor Solicitation request/messages sent while performing Duplicate Address Detection on a tentative address. A value of zero indicates that Duplicate Address Detection is not performed on tentative addresses. A value of one indicates a single transmission with no follow-up retransmissions.

The relay node device 110 may receive data packets from the network router 150. Using an IPv6 type socket filter, the relay node device 110 may filter the data packets and identify IPv6 data packets among the data packets received from the network router 150. The IPv6 type socket filter may include a Berkeley Packet Filter (BPF) code. BPF allows a node device to attach a filter onto any socket and allow or disallow certain types of data to come through the socket. In one embodiment, the BPF code may allow only IPv6 data packets to come through, while dropping or diverting other types of packets (e.g., IPv4). In some embodiments, the BPF code may allow both IPv4 and IPv6 data packets to come through. The relay node device 110 may be able to identify the IPv6 data packets based on, for example, the IPv6 header format found in the data packets. The IPv6 header format may include a "version" (e.g., Internet Protocol version number 6). The IPv6 header format may additionally include a "Traffic Class," which may be, for example, an 8-bit traffic class field. The IPv6 header format may include a "Flow Label," which may be, for example, a 20-bit flow label. The IPv6 header format may further indicate a payload length (e.g., a 16-bit unsigned integer). The length of the IPv6 payload is the rest of the packet following the IPv6 header, in octets. Any extension headers present are considered part of the payload, i.e., included in the length count. The IPv6 header format may include a "Hop Limit," which may be, for example, an 8-bit unsigned integer. The hop limit is decremented by 1 by each node device (e.g., relay device or client device) that forwards the IPv6 packet. When forwarding, the packet is discarded if the hop limit is zero when received or is decremented to zero. A node device that is the destination of a packet may not discard a packet with a hop limit equal to zero and can process the packet normally. The IPv6 header format may include a source address, which may be a 128-bit address of the originator of the IPv6 packet, and a destination address, which may be a 128-bit address of the intended recipient of the IPv6 packet.

In IPv6, optional internet-layer information is encoded in separate headers that may be placed between the IPv6 header and the upper-layer header in a packet. There is a small number of such extension headers, each one identified by a distinct Next Header value. Extension headers are numbered from Internet Assigned Numbers Authority (TANA) IP protocol numbers, the same values used for IPv4 and IPv6. When processing a sequence of Next Header values in a packet, the first one that is not an extension header indicates that the next item in the packet is the corresponding upper-layer header. A special "No Next Header" value is used if there is no upper-layer header.

IPv6 also requires that every link in the Internet have a maximum transmission unit (MTU) of 1280 octets or greater. This is known as the IPv6 minimum link MTU. On any link that cannot convey a 1280-octet packet in one piece, link-specific fragmentation and reassembly are provided at a layer below IPv6. Links with a configurable MTU (e.g., PPP links) may be configured to have an MTU of at least 1280 octets. For any link that cannot convey a 1280-octet packet in one piece, it is recommended that they be configured with an MTU of 1500 octets or greater to accommodate possible encapsulations (e.g., tunneling) without incurring IPv6-layer fragmentation. From each link to which a node device is directly attached, the node device can accept packets as large as that link's MTU. It is also recommended that IPv6 nodes implement Path MTU Discovery in order to discover and take advantage of path MTUs greater than 1280 octets. However, a minimal IPv6 implementation (e.g., in a boot ROM) may simply restrict itself to sending packets no larger than 1280 octets, and omit implementation of Path MTU Discovery.

In order to send a packet larger than a path's MTU, a node device may use the IPv6 Fragment header to fragment the packet at the source and have it reassembled at the destination(s). However, the use of such fragmentation is discouraged in any application that can adjust its packets to fit the measured path MTU (i.e., down to 1280 octets). A node device can accept a fragmented packet that, after reassembly, is as large as 1500 octets. A node device can accept fragmented packets that reassemble to more than 1500 octets. An upper-layer protocol or application that depends on IPv6 fragmentation to send packets larger than the MTU of a path cannot send packets larger than 1500 octets unless it has an assurance that the destination is capable of reassembling packets of that larger size.

The relay node device 110 initially checks the IPv6 data packets to see if they include an internet control message protocol version 6 (ICMPv6) message. Internet Control Message Protocol version 6 (ICMPv6) is the implementation of the Internet Control Message Protocol (ICMP) for Internet Protocol version 6 (IPv6). ICMPv6 performs error reporting and diagnostic functions. ICMPv6 has a framework for extensions to implement new features. Several extensions exist, defining new ICMPv6 message types as well as new options for existing ICMPv6 message types. For example, Neighbor Discovery Protocol (NDP) is a node device discovery protocol based on ICMPv6 that replaces and enhances the functions of address resolution protocol (ARP). NDP is a protocol used to map IP addresses to hardware addresses used by a data link protocol. Each node device within the mesh network system may sniff for NDP data packets over either its upstream interface or downstream interface to discover other node devices connected to the corresponding physical network. When an NDP request is received by the node device over one of its interfaces, the receiving node device may parse the NDP request to learn the sender's IP address, MAC address, and/or location that is included in the data packet of the NDP request. The receiving node device may then use the source's IP address as a key to update entries in its host record hash table. Each entry in the host record hash table may contain the host's (i.e., node device's) information on IP address, MAC address, and/or location. When the receiving node device discovers a new node device, the receiving node device may create a new entry into its host record hash table.

Secure Neighbor Discovery (SEND) is an extension of NDP with extra security. Multicast Listener Discovery (MLD) is used by IPv6 routers for discovering multicast listeners on a directly attached link. Multicast Router Discovery (MRD) allows the discovery of multicast routers. ICMPv6 messages may be classified as error messages and information messages. ICMPv6 messages are transported by IPv6 packets in which the IPv6 Next Header value for ICMPv6 is set to the value 58. The ICMPv6 message consists of a header and the protocol payload. The header contains only three fields: type (8 bits), code (8 bits), and checksum (16 bits). Type specifies the type of the message. Values in the range from 0 to 127 (high-order bit is 0) indicate an error message, while values in the range from 128 to 255 (high-order bit is 1) indicate an information message. The code field value depends on the message type and provides an additional level of message granularity. The checksum field provides a minimal level of integrity verification for the ICMP message.

ICMPv6 provides a minimal level of message integrity verification by the inclusion of a 16-bit checksum in its header. The checksum is calculated starting with a pseudo-header of IPv6 header fields, which consists of the source and destination addresses, the packet length, and the next header field, the latter of which is set to the value 58. Following this pseudo-header, the checksum is continued with the ICMPv6 message. The checksum computation is performed according to Internet protocol standards using 16-bit ones' complement summation, followed by a final ones' complement of the checksum itself and inserting it into the checksum field.

If there is an ICMPv6 message, then the relay node device 110 performs a stateless address auto configuration (SLAAC) of the client device. If there are no ICMPv6 messages, then the relay node device 110 looks for an anycast or multicast, or link-local address. An anycast address is an identifier for a set of interfaces (typically belonging to different nodes). A packet sent to an anycast address is delivered to one of the interfaces identified by that address (the "nearest" one, according to the routing protocol's measure of distance). A multicast address is an identifier for a set of interfaces (typically belonging to different nodes). A packet sent to a multicast address is delivered to all interfaces identified by that address. A link-local address is an address having link-only scope that can be used to reach neighboring nodes attached to the same link. All interfaces have a link-local unicast address. If an anycast, a multicast, or a link-local address is present in the IPv6 packets, then the relay node device 110 forwards the IPv6 data packets to the client device over the first interface. A node device that originates an ICMPv6 message has to determine both the Source and Destination IPv6 Addresses in the IPv6 header before calculating the checksum. If the node device has more than one unicast address, it can choose the Source Address of the message as follows: (a) If the message is a response to a message sent to one of the node's unicast addresses, the Source Address of the reply can be that same address. (b) If the message is a response to a message sent to any other address, such as a multicast address, an anycast address implemented by the node, or a unicast address that does not belong to the node. The Source Address of the ICMPv6 packet can be a unicast address belonging to the node. The address can be chosen according to the rules that would be used to select the source address for any other packet originated by the node, given the destination address of the packet. However, it may be selected in an alternative way if this would lead to a more informative choice of address reachable from the destination of the ICMPv6 packet.

Figure 4:
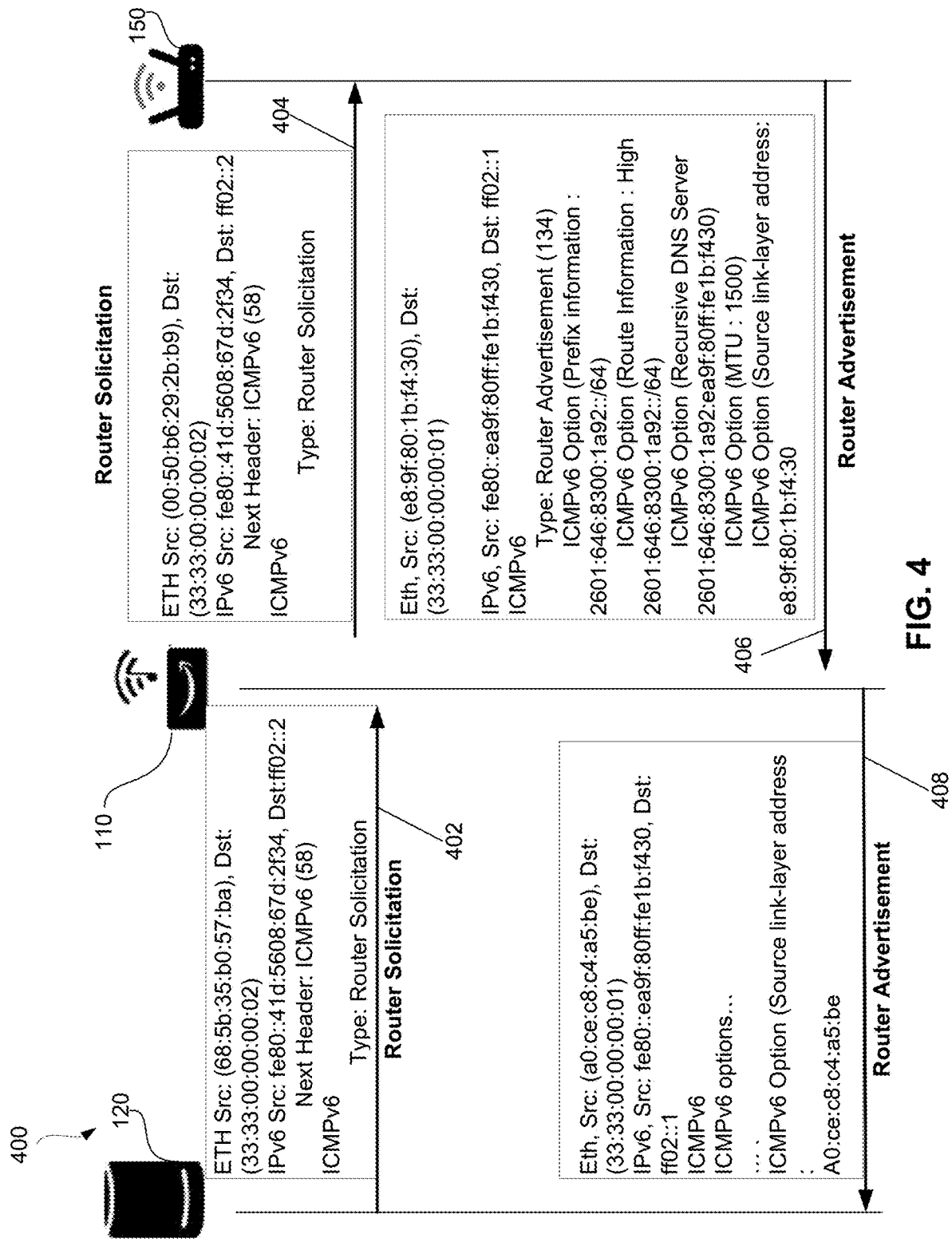
FIG. 4 shows a partial view of the mesh network system shown in FIG. 1 and corresponding communication between component devices for implementing a relay process, according to one embodiment.

FIG. 4 shows a partial view 400 of the mesh network system 100 shown in FIG. 1, including the relay node device 110, the client node device 130, and the home AP router 150. At operation 402, the relay node device 110 receives a Router Solicitation request/message from the client node device 120. A router can silently discard any received Router Solicitation messages that do not satisfy all of the following validity checks: The IP Hop Limit field has a value of 255, i.e., the packet could not possibly have been forwarded by a router. ICMP Checksum is valid. ICMP Code is 0. ICMP length (derived from the IP length) is 8 or more octets. All included options have a length that is greater than zero. If the IP source address is the unspecified address, there is no source link-layer address option in the message. The contents of the Reserved field, and of any unrecognized options, can be ignored. A solicitation that passes the validity checks is called a "valid solicitation."

At operation 404, the relay node device 110 sends the Router Solicitation message to the network router 150. In addition to sending periodic, unsolicited advertisements, a router sends advertisements in response to valid solicitations received on an advertising interface. A router may choose to unicast the response directly to the soliciting host's address (if the solicitation's source address is not the unspecified address), but the usual case is to multicast the response to the all-nodes group. In the latter case, the interface's interval timer is reset to a new random value, as if an unsolicited advertisement had just been sent. In all cases, Router Advertisement response sent in response to a Router Solicitation request can be delayed by a random time between 0 and MAX_RA_DELAY_TIME seconds. (If a single advertisement is sent in response to multiple solicitations, the delay is relative to the first solicitation.) In addition, consecutive Router Advertisement responses sent to the all-nodes multicast address can be rate limited to no more than one advertisement every MIN_DELAY_BETWEEN_RAS seconds.

A router is permitted to send multicast Router Advertisement responses more frequently than indicated by the MinRtrAdvInterval configuration variable so long as the more frequent advertisements are responses to Router Solicitation requests. In all cases, however, unsolicited multicast advertisements cannot be sent more frequently than indicated by MinRtrAdvInterval. Router Solicitation requests in which the Source Address is the unspecified address cannot update the router's Neighbor Cache; solicitations with a proper source address update the Neighbor Cache as follows: If the router already has a Neighbor Cache entry for the solicitation's sender, the solicitation contains a Source Link-Layer Address option, and the received link-layer address differs from that already in the cache, then the link-layer address can be updated in the appropriate Neighbor Cache entry, and its reachability state can also be set to STALE. If there is no existing Neighbor Cache entry for the solicitation's sender, the router creates one, installs the link-layer address, and sets its reachability state to STALE. If there is no existing Neighbor Cache entry and no Source Link-Layer Address option is present in the solicitation, the router may respond with either a multicast or a unicast router advertisement. Whether or not a Source Link-Layer Address option is provided, if a Neighbor Cache entry for the solicitation's sender exists (or is created), the entry's router flag can be set to FALSE.

At operation 406, the relay node device 110 receives a Router Advertisement message from the network router 150, in response. A router sends periodic as well as solicited Router Advertisements through its interfaces. A router might want to send Router Advertisements without advertising itself as a default router. For instance, a router might advertise prefixes for stateless address autoconfiguration while not wishing to forward packets. Such a router sets the Router Lifetime field in outgoing advertisements to zero. A router may choose not to include some or all options when sending unsolicited Router Advertisements. For example, if prefix lifetimes are much longer than AdvDefaultLifetime, including them every few advertisements may be sufficient. However, when responding to a Router Solicitation or while sending the first few initial unsolicited advertisements, a router can include all options so that all information (e.g., prefixes) is propagated quickly during system initialization. If including all options causes the size of an advertisement to exceed the link MTU, multiple advertisements can be sent, each containing a subset of the options. A node device can silently discard any received Router Advertisement messages that do not satisfy all of the following validity checks: IP Source Address is a link-local address. Routers can use their link-local address as the source for Router Advertisement and Redirect messages so that hosts can uniquely identify routers. The IP Hop Limit field has a value of 255, i.e., the packet could not possibly have been forwarded by a router. ICMP Checksum is valid. ICMP Code is 0. ICMP length (derived from the IP length) is 16 or more octets. All included options have a length that is greater than zero. The contents of the Reserved field, and of any unrecognized options, can be ignored. An advertisement that passes the validity checks is called a "valid advertisement."

At operation 408, the relay node device 110 sends the Router Advertisement message to the client node device 130. When an interface becomes enabled, a node device may be unwilling to wait for the next unsolicited Router Advertisement to locate default routers or learn prefixes. To obtain Router Advertisements quickly, a node device can transmit up to MAX_RTR_SOLICITATIONS Router Solicitation messages, each separated by at least RTR_SOLICITATION_ INTERVAL seconds. Router Solicitation requests may be sent after any of the following events: The interface is initialized at relay node device startup. The interface is reinitialized after a temporary interface failure or after being temporarily disabled by system management of the relay node device. The relay node device then changes from being a router to being a node device by having its IP forwarding capability turned off by its system management. The node device attaches to a link for the first time. The node device re-attaches to a link after being detached for some time. A node device sends Router Solicitation requests to the all-routers multicast address. The IP source address is set to either one of the interface's unicast addresses or the unspecified address. The Source Link-Layer Address option can be set to the node's link-layer address if the IP source address is not the unspecified address.

Figure 5:
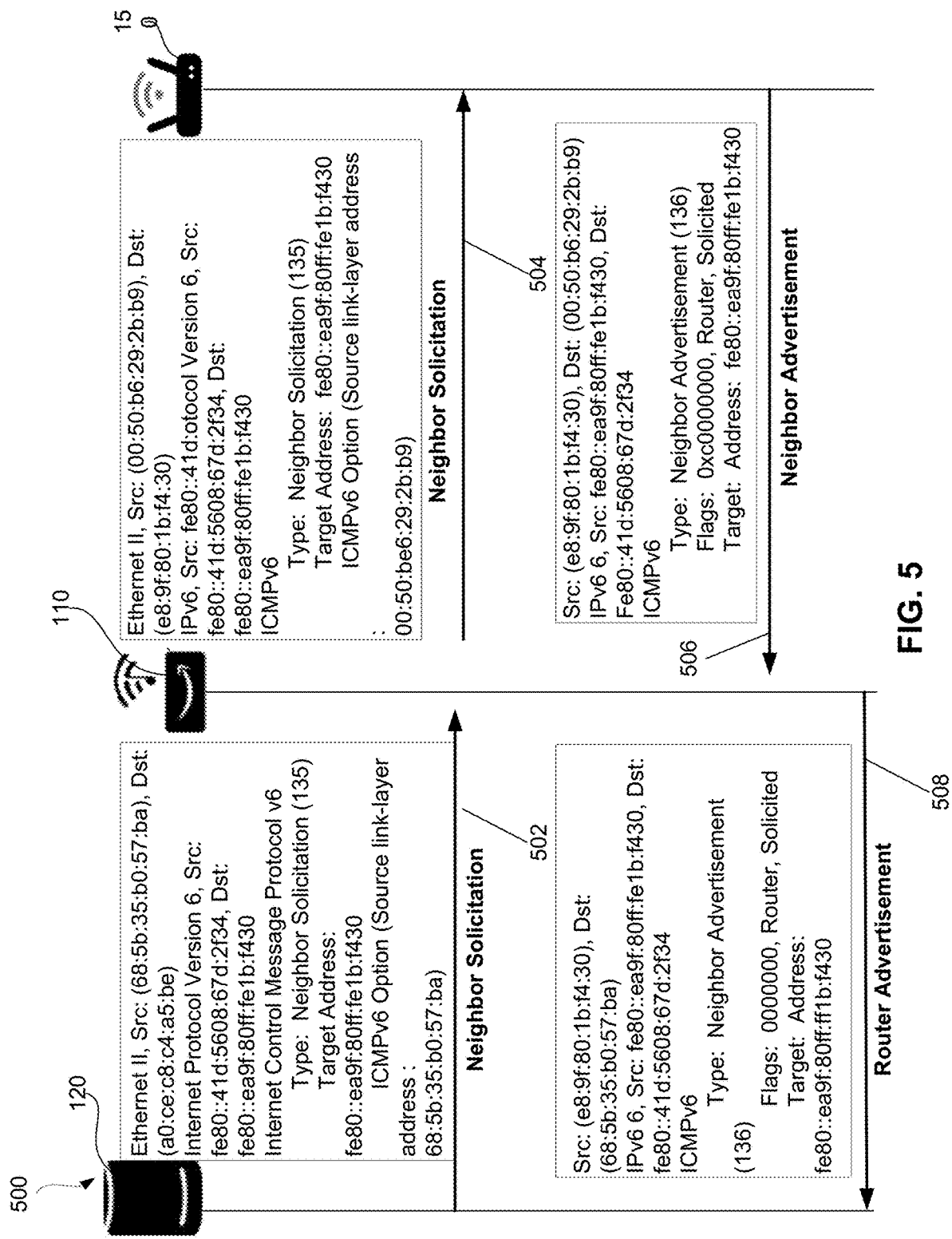
FIG. 5 shows a partial view of the mesh network system shown in FIG. 1 and corresponding communication between component devices for implementing a relay process, according to one embodiment.

FIG. 5 shows a partial view 500 of the mesh network system 100 shown in FIG. 1, including the relay node device 110, the client node device 130, and the home AP router 150. In a first operation 502, the relay node device 110 receives a Neighbor Solicitation message from the client node device 130. Upon receipt of a valid Neighbor Solicitation message on an interface, node device 110 behavior depends on whether or not the target address is tentative. If the target address is not tentative (i.e., assigned to the receiving interface), the solicitation is processed as described below. If the target address is tentative and the source address is a unicast address, the solicitation's sender is performing address resolution on the target; the solicitation can be silently ignored. Otherwise, processing takes place as described below. In all cases, a node device cannot respond to a Neighbor Solicitation request for a tentative address. If the source address of the Neighbor Solicitation request is the unspecified address, the solicitation is from a node device performing Duplicate Address Detection. If the solicitation is from another node, the tentative address is a duplicate and cannot be used (by either node). If the solicitation is from the node device itself (because the node device loops back multicast packets), the solicitation does not indicate the presence of a duplicate address.

Many interfaces provide a way for upper layers to selectively enable and disable the looping back of multicast packets. The details of how such a facility is implemented may prevent Duplicate Address Detection from working correctly. The following tests identify conditions under which a tentative address is not unique: If a Neighbor Solicitation request for a tentative address is received before one is sent, the tentative address is a duplicate. This condition occurs when two nodes run Duplicate Address Detection simultaneously, but transmit initial solicitations at different times (e.g., by selecting different random delay values before joining the solicited-node device multicast address and transmitting an initial solicitation). If the actual number of Neighbor Solicitation requests received exceeds the number expected based on the loopback semantics (e.g., the interface does not loop back the packet, yet one or more solicitations were received), the tentative address is a duplicate. This condition occurs when two nodes run Duplicate Address Detection simultaneously and transmit solicitations at roughly the same time.

A node device can silently discard any received Neighbor Solicitation messages that do not satisfy all of the following validity checks: The IP Hop Limit field has a value of 255, i.e., the packet could not possibly have been forwarded by a router. ICMP Checksum is valid. ICMP Code is 0. ICMP length (derived from the IP length) is 24 or more octets. Target Address is not a multicast address. All included options have a length that is greater than zero. If the IP source address is the unspecified address, the IP destination address is a solicited-node device multicast address. If the IP source address is the unspecified address, there is no source link-layer address option in the message. The contents of the Reserved field, and of any unrecognized options, can be ignored. Future, backward-compatible changes to the protocol may specify the contents of the Reserved field or add new options; backward-incompatible changes may use different Code values. A Neighbor Solicitation request that passes the validity checks is called a "valid solicitation."

At operation 504, the relay node device 110 sends the Neighbor Solicitation request to the network router 150. Before sending a Neighbor Solicitation, an interface can join the all-nodes multicast address and the solicited-node device multicast address of the tentative address. The former ensures that the node device receives Neighbor Advertisement responses from other nodes already using the address; the latter ensures that two nodes attempting to use the same address simultaneously can detect each other's presence. To check an address, a node device sends DupAddrDetectTransmits Neighbor Solicitation requests, each separated by RetransTimer milliseconds. The solicitation's Target Address is set to the address being checked, the IP source is set to the unspecified address, and the IP destination is set to the solicited-node device multicast address of the target address. If the Neighbor Solicitation request is going to be the first message sent from an interface after interface (re)initialization, the node device can delay joining the solicited-node device multicast address by a random delay between 0 and MAX_RTR_SOLICITATION_DELAY. This serves to alleviate congestion when many nodes start up on the link at the same time, such as after a power failure, and may help to avoid race conditions when more than one node device is trying to solicit for the same address at the same time. Even if the Neighbor Solicitation request is not the first message sent, the node device can delay joining the solicited-node device multicast address by a random delay between 0 and MAX_RTR_SOLICITATION_DELAY if the address being checked is configured by a router advertisement message sent to a multicast address. The delay will avoid similar congestion when multiple nodes configure addresses by receiving the same single multicast router advertisement.

It can be noted, however, that when a node device joins a multicast address, it typically sends a Multicast Listener Discovery (MLD) report message for the multicast address. In the case of Duplicate Address Detection, the MLD report message is required in order to inform MLD-snooping switches, rather than routers, to forward multicast packets. In the above description, the delay for joining the multicast address thus means delaying transmission of the corresponding MLD report message. Since the MLD specifications do not request a random delay to avoid race conditions, just delaying Neighbor Solicitation request would cause congestion by the MLD report messages. The congestion would then prevent the MLD-snooping switches from working correctly and, as a result, prevent Duplicate Address Detection from working. In this case, the requirement to include the delay for the MLD report avoids this scenario. In order to improve the robustness of the Duplicate Address Detection algorithm, an interface can receive and process datagrams sent to the all-nodes multicast address or solicited-node device multicast address of the tentative address during the delay period. This does not necessarily conflict with the requirement that joining the multicast group be delayed. In fact, in some cases, a node device can start listening to the group during the delay period before MLD report transmission. It can be noted, however, that in some link-layer environments, particularly with MLD-snooping switches, no multicast reception will be available until the MLD report is sent.

At operation 506, the relay node device 110 receives a Neighbor Advertisement response/message from the network router 150. Upon receipt of a valid Neighbor Advertisement message on an interface, node device behavior depends on whether the target address is tentative or matches a unicast or anycast address assigned to the interface: 1) If the target address is tentative, the tentative address is not unique; 2) If the target address matches a unicast address assigned to the receiving interface, it would possibly indicate that the address is a duplicate, but it has not been detected by the Duplicate Address Detection procedure.

A node device can silently discard any received Neighbor Advertisement messages that do not satisfy all of the following validity checks: The IP Hop Limit field has a value of 255, i.e., the packet could not possibly have been forwarded by a router. ICMP Checksum is valid. ICMP Code is 0. ICMP length (derived from the IP length) is 24 or more octets. Target Address is not a multicast address. If the IP Destination Address is a multicast address, the Solicited flag is zero. All included options have a length that is greater than zero. The contents of the Reserved field, and of any unrecognized options, can be ignored. A Neighbor Advertisement response that passes the validity checks is called a "valid advertisement."

At operation 508, the relay node device sends the Neighbor Advertisement message to the client node device 130. A node device sends a Neighbor Advertisement response in response to a valid Neighbor Solicitation request targeting one of the node's assigned addresses. The Target Address of the advertisement is copied from the Target Address of the solicitation. If the solicitation's IP Destination Address is not a multicast address, the Target Link-Layer Address option may be omitted; the neighboring node's cached value can already be current in order for the solicitation to have been received. If the solicitation's IP Destination Address is a multicast address, the Target Link-Layer option can be included in the advertisement. Furthermore, if the node device is a router, it can set the Router flag to one; otherwise, it can set the flag to zero.

If the Target Address is either an anycast address or a unicast address for which the node device is providing proxy service, or the Target Link-Layer Address option is not included, the Override flag can be set to zero. Otherwise, the Override flag can be set to one. Proper setting of the Override flag ensures that nodes give preference to non-proxy advertisements, even when received after proxy advertisements, and also ensures that the first advertisement for an anycast address "wins." If the source of the solicitation is the unspecified address, the node device can set the Solicited flag to zero and multicast the advertisement to the all-nodes address. Otherwise, the node device can set the Solicited flag to one and unicast the advertisement to the Source Address of the solicitation. If the Target Address is an anycast address, the sender can delay sending a response for a random time between 0 and MAX_ANYCAST_DELAY_TIME seconds. Because unicast Neighbor Solicitation requests are not required to include a Source Link-Layer Address, it is possible that a node device sending a solicited Neighbor Advertisement response does not have a corresponding link-layer address for its neighbor in its Neighbor Cache. In such situations, a node device will first have to use Neighbor Discovery to determine the link-layer address of its neighbor (i.e., send out a multicast Neighbor Solicitation).

Figure 6A:
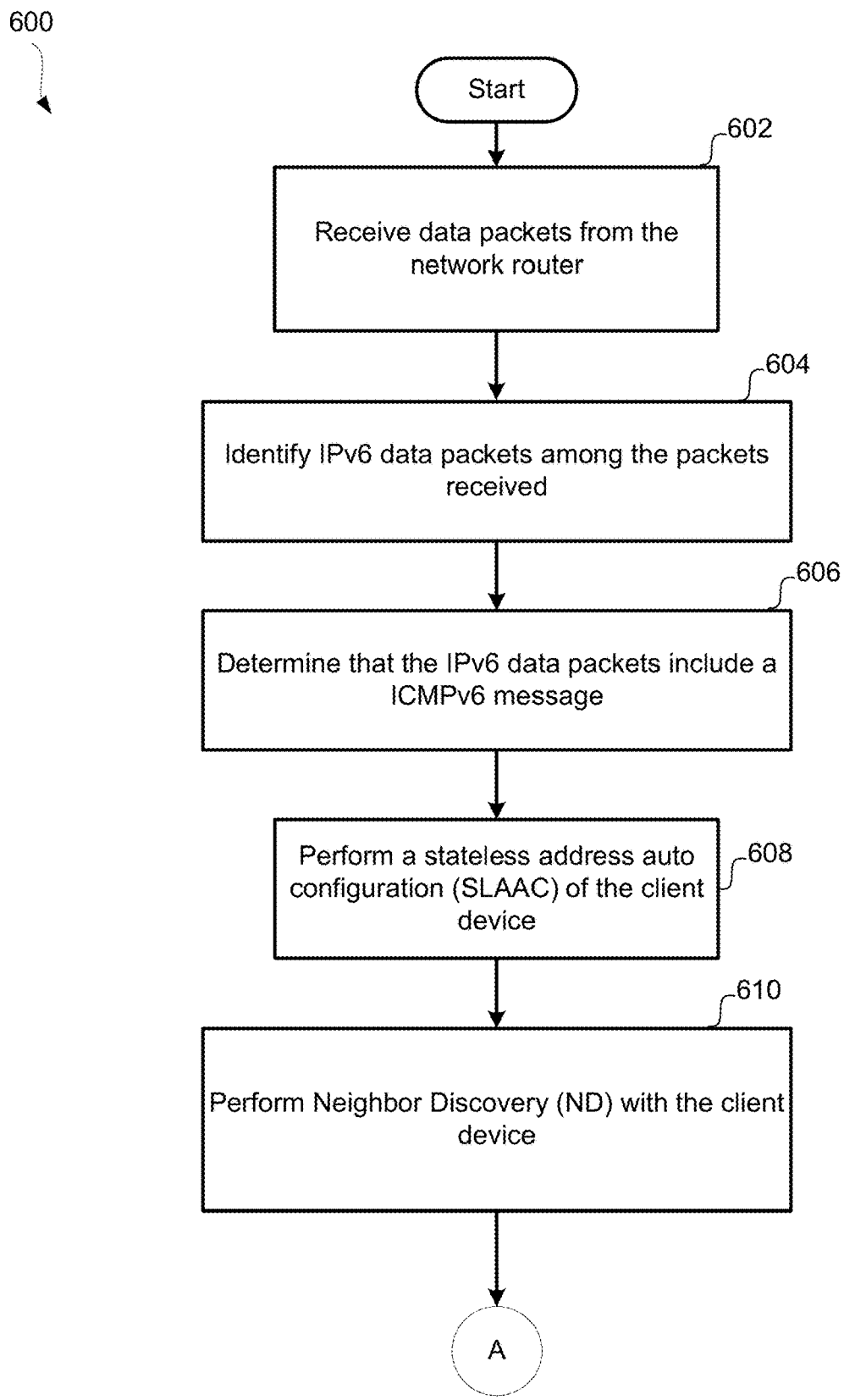
FIGS. 6A and 6B show a flow diagram of a method for establishing a wireless mesh network and relaying IPv6 packets according to one embodiment.
Figure 6B:
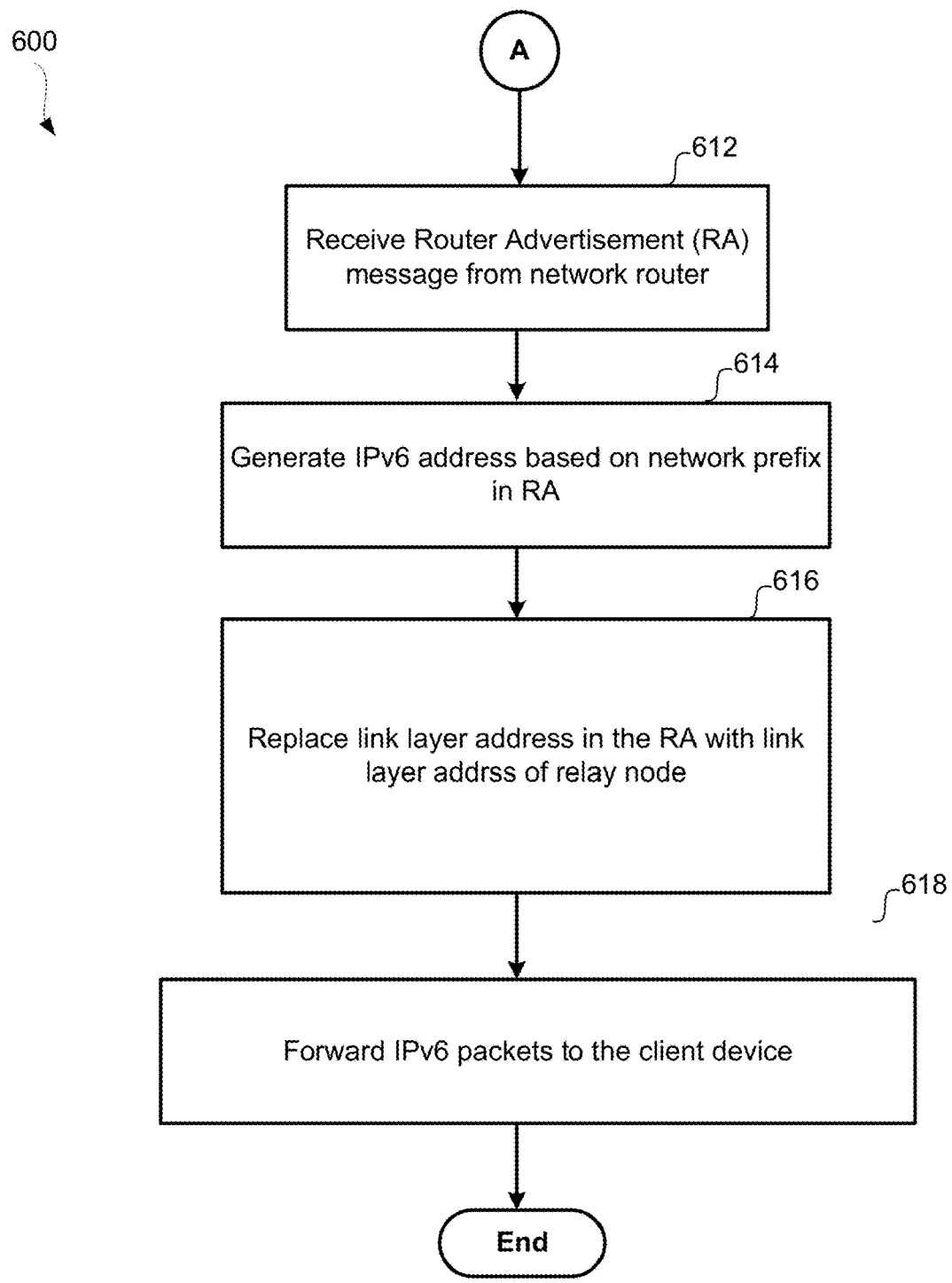

FIG. 6A is a flow diagram of a method 600 for establishing a wireless mesh network and relaying IPv6 packets according to one embodiment. The first operation 602 involves client device configuration where a relay node device (e.g., relay node device 110) configures a client device (e.g., client node device 130) to receive IPv6 packets. At operation 604, the client node device 130 receives a Router Advertisement (RA) message (e.g., as shown in operation 408), which includes a network prefix, and client node device 130 generates its own IPv6 address based on that network prefix in the RA. Additionally, Domain Name Server (DNS) information is advertised in Recursive DNS Server Option (RNSS) option of the RA. At operation 606, the relay node device replaces a link-layer address in the RA with its own corresponding link-layer address so that the client device can send subsequent packets back to the relay node. At operation 608, the client device, which has an IPv6 link-local address, broadcasts a Router Solicitation (RS) request to query the network router 150, and relay node device relays the RS to the network router 150. In response, network router 150 provides RA, and relay node device 110 relays it back to client node device 130, and client device receives the relayed RA, and generates its IPv6 address per the RA, at operation 610. Operations 608-610 may be a Stateless Address Auto Configuration (SLAAC) operation.

At operation 612, the relay node device captures and relays the Neighbor Solicitation (NS) messages to the network router 150. At operation 614, the relay node device captures and relays the Neighbor Advertisement (NA) messages to the client node device 130, and updates the host table in order to forward subsequent packets. At operation 616, the relay node device 110 also updates the kernel policy route table when parsing the NA. Operations 612-616 may be referred to as the Neighbor Discovery operation.

At operation 618, the relay node device may forward all the packets received. All packets received by the relay device are forwarded between interfaces, unless the packet is invalid or directly addressed to the relay device. Policy-based routing is a way to have a set policy override routing protocol decisions. Policy-based routing includes mechanisms for selectively applying policies based on an access list, a packet size, or other criteria set by a network administrator. A router may be responsible for deciding where to forward a received data packet based on the destination address in the data packet, which is then used to look up an entry in a routing rules table. However, in some cases, there may be a need to forward the packet based on other criteria, and this is where PBR can be used to redirect traffic to a proxy designated by the policy rules.

As described in the previous embodiments, Router Solicitation (RS) is when an interface becomes enabled, hosts may send out Router Solicitations that request routers to generate Router Advertisements immediately rather than at their next scheduled time. Router Advertisement (RA) response is when routers advertise their presence together with various link and Internet parameters either periodically, or in response to a Router Solicitation message. Router Advertisement responses contain prefixes that are used for determining whether another address shares the same link (on-link determination) and/or address configuration, a suggested hop limit value, etc.

Neighbor Solicitation (NS) request is sent by a node device to determine the link-layer address of a neighbor, or to verify that a neighbor is still reachable via a cached link-layer address. Neighbor Solicitation requests are also used for Duplicate Address Detection. Neighbor Advertisement (NA) response is a response to a Neighbor Solicitation message. A node device may also send unsolicited Neighbor Advertisement responses to announce a link-layer address change.

In another embodiment, anycast and multicast forwarding processes are implemented between the component devices in the mesh network system 100. The relay node device 110 may also operate to forward/relay anycast and multicast data packets between nodes in the second physical network and nodes in the first physical network. This way, nodes across the second physical network and the first physical network may discover each other using anycast and multicast protocols such as SSDP (simple service discovery protocol) and mDNS (multicast DNS). The client node device 130 transmits a multicast data packet (SSDP M-Search request) to discover services over the SSDP that are available within the mesh network system 100. The multicast IPv6 address set used by SSDP can be ff0X::c, where X indicates the scope range ([FF02::C] (IPv6 link-local), [FF05::C] (IPv6 site-local), [FF08::C] (IPv6 organization-local), [FF0E::C] (IPv6 global)), and the corresponding destination address is 33:33: 0:0:0:C. NDPNeighbor Discovery is a known protocol used to map IP addresses to hardware addresses used by a data link protocol.

The relay node device 110 receives the SSDP M-Search request over its downstream interface and updates the source MAC address within the SSDP M-Search request to identify relay node's 110 upstream interface (a0:ce:c8:c4:a5:be). The relay node device 110 then broadcasts the updated SSDP M-Search request over the first physical network through its upstream interface.

The wireless device 160 connected to the home AP router 150 may also include a connection with the relay node device 110 through a third physical network. The wireless device 160 receives the updated SSDP M-Search request from the relay node device 110 through the third physical network. After receiving the updated SSDP M-Search request from the relay node device 110, the wireless device 160 generates and transmits a reply with a unicast data packet in the form of the SSDP M-Search response. The SSDP M-Search response may be addressed to IP address fe80::a2ce:c8ff:fec4:a5be with a destination MAC address ofa0:ce:c8:c4:a5:be, because the wireless device 160 believes IP address fe80::a2ce:c8ff:fec4:a5be has the MAC address a0:ce:c8:c4:a5:be based on the data packet information received in the SSDP M-Search request.

The relay node device 110 having MAC address a0:ce: c8:c4:a5:be receives the SSDP M-Search response from the wireless device 160, and the relay node device 110 forwards the SSDP M-Search response to the client node device 130 by kernel mode routing. The SSDP M-Search response is forwarded to the client node device 130 by the kernel mode routing because the relay node device 110 recognizes the SSDP M-Search response is a unicast data packet.

Although the anycast and multicast forwarding processes described above specifically describe the usage case for communicating an SSDP M-Search request, other usage cases for different types of multicast protocols are also applicable. For example, instead of the SSDP M-Search request, the client node device 130 may transmit an mDNS, upnp, iptv, or other multicast protocol request. In response, the wireless device 160 may respond with a corresponding mDNS, upnp, iptv, or other multicast protocol response. While FIGS. 1-5 illustrate relay node device 110 as having only two interfaces, the functionality of the relay node device 110 has been simplified for illustrative purposes only. The relay node device 110 is not limited to two interfaces, and it can be extended to multiple interfaces in multiple directions. For example, traffic direction can be tracked between multiple interfaces by having a table to keep track of mapping of addresses between the multiple interfaces. In addition to the source link-layer address replacement, the relay node device's routing table can be modified based on the ICMPv6 frames received from each interface of the multiple interfaces. Additionally, while relay node device 110 is used merely as an example, any of the devices 120, 130, 140, 170, and 180 can provide the same functionality as relay node device 110 to provide an extended mesh structure that is similar to a multi-tier mesh network.

Figure 7:
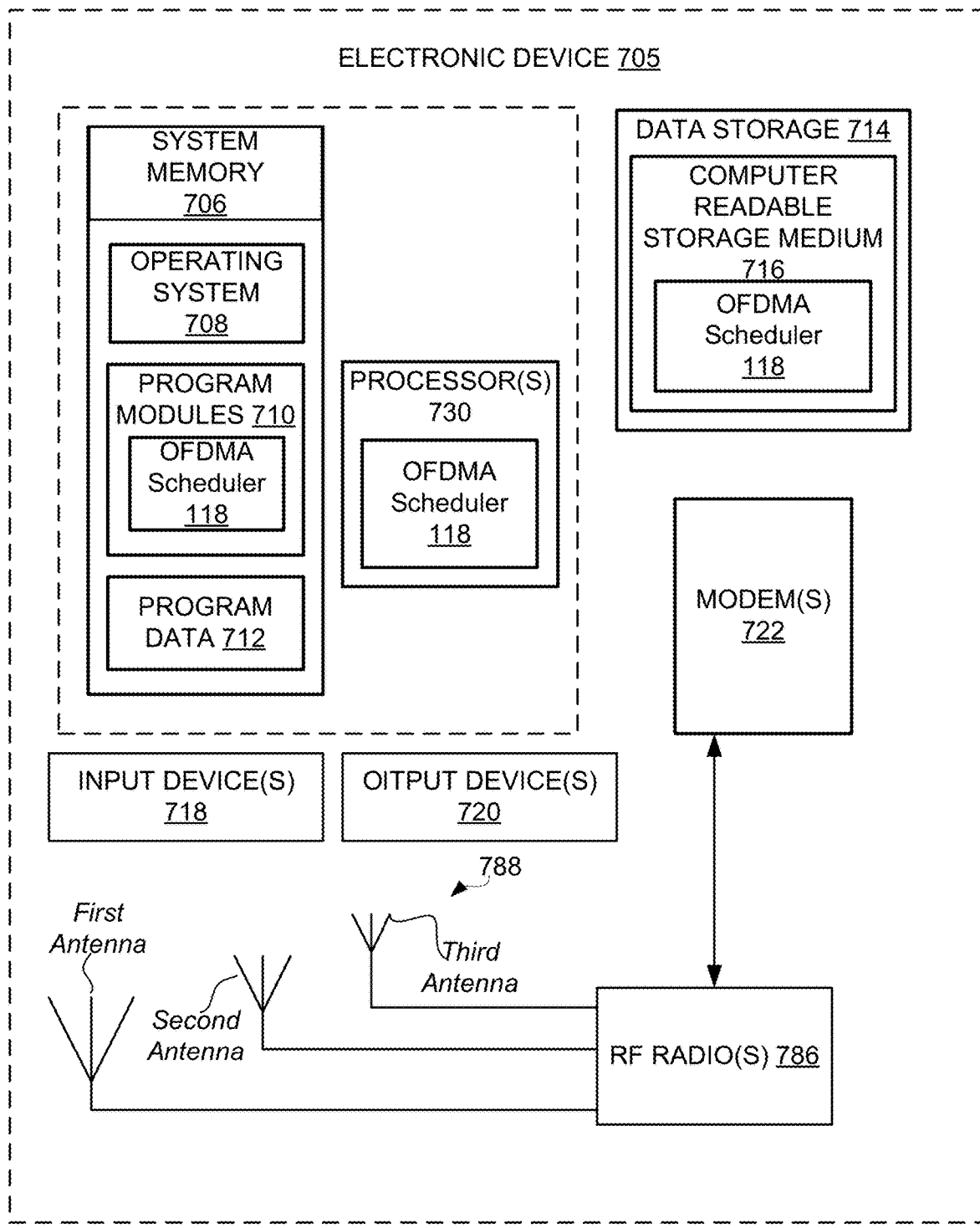
FIG. 7 is a block diagram of an electronic device in which embodiments of a relay device for relaying IPv6 data packets may be implemented.

FIG. 7 is a block diagram of an electronic device 705 in which embodiments of a relay node device 110 may be implemented. The electronic device 705 may correspond to the relay node device 110 of FIGS. 1-5. The electronic device 705 may be any type of computing device such as voice control and speaker devices, televisions, television set-top boxes, television dongles, an electronic book reader, a PDA, a mobile phone, a laptop computer, a portable media player, a tablet computer, a camera, a video camera, a netbook, a desktop computer, a gaming console, a DVD player, Blu-ray® player, a computing pad, a media center, an audio-input-enabled device, a speech-based personal data assistant, or the like. The electronic device 705 may be any portable or stationary user device. For example, the electronic device 705 may be an intelligent voice control and speaker system. Alternatively, the electronic device 705 can be any other device used in a WLAN network (e.g., Wi-Fi® network), a WAN network, or the like.

The electronic device 705 includes one or more processor(s) 730, such as one or more CPUs, microcontrollers, field programmable gate arrays, or other types of processing devices. The electronic device 705 also includes system memory 706, which may correspond to any combination of volatile and/or non-volatile storage mechanisms. The system memory 706 stores information that provides operating system component 708, various program modules 710, such as the relay node device 110 described herein, program data 712, and/or other components. In one embodiment, the system memory 706 stores instructions of the methods as described herein. The electronic device 705 performs functions by using the processor(s) 730 to execute instructions provided by the system memory 706.

The electronic device 705 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein, such as the relay node device 110 described herein. Instructions for the program modules 710 may reside, completely or at least partially, within the computer-readable storage medium 716, system memory 706 and/or within the processor(s) 730 during execution thereof by the electronic device 705, the system memory 706 and the processor(s) 730 also constituting computer-readable media. The electronic device 705 may also include one or more input devices 718 (keyboard, mouse device, specialized selection keys, etc.) and one or more output devices 720 (displays, printers, audio output mechanisms, etc.).

The electronic device 705 further includes a modem 722 to allow the electronic device 705 to communicate via a wireless network (e.g., such as provided by the wireless communication system) with other computing devices, such as remote computers, an item-providing system, and so forth. The modem 722 can be connected to one or more radios 786. The radios may include a WLAN radio, a WAN radio, a PAN radio, or the like, as described herein. Antennas 788 are coupled to the radios 786, which are coupled to the modem 722. The antennas 788 may include one or more WLAN antennas, one or more PAN antennas, or the like. Additional antennas may be used and may be GPS antennas, NFC antennas, other WAN antennas, or the like. The modem 722 allows the electronic device 705 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 722 may generate signals and send these signals to antennas 788, via RF radio(s) 786 as described herein. Electronic device 705 may additionally include a WLAN radio, a GPS receiver, a PAN transceiver, and/or other RF radios. These RF radios may additionally or alternatively be connected to one or more antennas 788. Antennas 788 may be configured to transmit in different frequency bands and/or using different wireless communication protocols. The antennas 788 may be directional, omnidirectional, or non-directional antennas. In addition to sending data, antennas 788 may also receive data, which is sent to appropriate RF radios connected to the antennas.

In one embodiment, the electronic device 705 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna element, and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 722 is shown to control transmission and reception via the antenna (788), the electronic device 705 may alternatively include multiple modems, each of which is configured to transmit/receive data via a different antenna and/or wireless transmission protocol.

The electronic device 705 delivers and/or receives items, upgrades, and/or other information via the network. For example, the electronic device 705 may download or receive items from an item-providing system. The item-providing system receives various requests, instructions, and other data from the electronic device 705 via the network. The item-providing system may include one or more machines (e.g., one or more server computer systems, routers, gateways, etc.) that have processing and storage capabilities to provide the above functionality. Communication between the item-providing system and the electronic device 705 may be enabled via any communication infrastructure. One example of such an infrastructure includes a combination of a wide area network (WAN) and wireless infrastructure, which allows a user to use the electronic device 705 to purchase items and consume items without being tethered to the item-providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another one of the wireless communication systems may be a wireless carrier system that can be implemented using various data processing equipment, communication towers, etc. Alternatively, or in addition, the wireless carrier system may rely on satellite technology to exchange information with the electronic device 705.

The communication infrastructure may also include a communication-enabling system that serves as an intermediary in passing information between the item-providing system and the wireless communication system. The communication-enabling system may communicate with the wireless communication system (e.g., a wireless carrier) via a dedicated channel and may communicate with the item-providing system via a non-dedicated communication mechanism, e.g., a public Wide Area Network (WAN) such as the Internet.

The electronic devices are variously configured with different functionality to enable the consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It can also be noted that the terms "when" or the phrase "in response to," as used herein, can be understood to indicate that there may be intervening time, intervening events, or both before the identified operation is performed.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution or implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions, when executed by the circuitry in a device, may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A relay computing device comprising:
a first interface configured to communicate with a first device;
a second interface configured to communicate with a second device;
a memory configured to store a transaction table including a lookup key and a corresponding request identifier (ID); and
a processor in communication with the memory, the processor configured to:
receive a plurality of data packets from the second device;
identify a plurality of IPv6 data packets among the plurality of data packets;
responsive to determining that one or more IPv6 data packets of the plurality of IPv6 data packets comprise an internet control message protocol version 6 (ICMPv6) message, perform a stateless address auto configuration (SLAAC) for the first device; and
send, to the first device, the plurality of the IPv6 data packets, wherein to perform the SLAAC, the processor is further configured to:
receive, from the first device, a first request;
relay, to the second device, the first request;
receive, from the second device, a first response comprising a link-layer address of the second device;
replace the link-layer address of the second device with a link-layer address of the relay computing device to generate a modified response; and
relay, to the first device, the modified response.

2. The relay computing device of claim 1, wherein the processor is further configured to:
receive a multicast packet request, the multicast packet request including a first device identifier (ID) as a first source device ID and including an IP address of a multicast address as a destination IP address;
send the multicast packet request to the second device;
receive a multicast packet response from the second device; and
send the multicast packet response to the first device.

3. The relay computing device of claim 2, wherein the first source device ID is an application network layer server device ID.

4. The relay computing device of claim 2, wherein the first device ID is a media access control (MAC) address of the first device.

5. The relay computing device of claim 1, wherein an IPv6 type socket comprises a Berkeley Packet Filter (BPF) code.

6. The relay computing device of claim 1, wherein the processor is further configured to:
generate a first routing policy instructing the relay computing device to route communications addressed to a first device ID through the first interface; and
generate a second routing policy instructing the relay computing device to route communications addressed to a device ID of the second device through the second interface.

7. The relay computing device of claim 1, wherein to perform the ND process, the processor is further configured to:
receive, from the first device, an IPv6 address for the first device, wherein the IPv6 address for the first device is based on a network prefix contained in the first response;
receive, from the first device over the first interface, a neighbor solicitation request;
relay, to the second device, the neighbor solicitation request;
receive, from the second device, a neighbor advertisement response comprising the link-layer address of the second device;
replace the link-layer address of the second device with the link-layer address of the relay computing device; and
relay, to the first device, the neighbor advertisement response comprising the link-layer address of the relay computing device.

8. The relay computing device of claim 1, wherein the first request prompts the second device to generate a Router Advertisement response immediately.

9. The relay computing device of claim 1, wherein the processor is further configured to perform a neighbor discovery (ND) process with the first device, wherein to perform the ND process, the processor is further configured to:
receive, from the first device, an IPv6 address for the first device, wherein the IPv6 address for the first device is based on a network prefix contained in the first response;
receive, from the first device, a neighbor solicitation request;
relay, to the second device, the neighbor solicitation request;
receive, from the second device, a neighbor advertisement response comprising the link-layer address of the second device;
replace the link-layer address of the second device with the link-layer address of the relay computing device; and
relay, to the first device, the neighbor advertisement response comprising the link-layer address of the relay computing device.

10. A method comprising:
implementing a mesh network by creating a virtual bridge on a relay computing device having a first interface configured to communicate with a client device, and a second interface configured to communicate with a network router;
receiving a plurality of data packets from a network router;
identifying a plurality of IPv6 data packets among the plurality of data packets;
responsive to determining that one or more IPv6 data packets of the plurality of IPv6 data packets comprise an internet control message protocol version 6 (ICMPv6) message, performing a stateless address auto configuration (SLAAC) for the client device; and
sending, to the client device, the plurality of the IPv6 data packets, wherein performing the SLAAC comprises:
receiving, from the client device, a router solicitation (RS) request;
relaying, to the network router, the RS request;
receiving, from the network router, a router advertisement response comprising a link-layer address of the network router;
replacing the link-layer address of the network router with a link-layer address of the relay computing device; and
relaying, to the client device, the router advertisement response comprising the link-layer address of the relay computing device.

11. The method of claim 10, further comprising performing a neighbor discovery (ND) process with the client device, wherein performing the ND process comprises:
receiving, from the client device, an IPv6 address for the client device, wherein the IPv6 address for the client device is based on a network prefix contained in the router advertisement response;
receiving, from the client device, a neighbor solicitation request;
relaying, to the network router, the neighbor solicitation request;
receiving, from the network router, a neighbor advertisement response comprising the link-layer address of the network router;
replacing the link-layer address of the network router with the link-layer address of the relay computing device; and
relaying, to the client device, the neighbor advertisement response comprising the link-layer address of the relay computing device.

12. The method of claim 10, further comprising:
receiving a multicast packet request, the multicast packet request including a client device ID as a first source device ID and including an IP address of a multicast address as a destination IP address;
sending the multicast packet request to the network router;
receiving a multicast packet response from the network router; and
sending the multicast packet response to the client device.

13. The method of claim 12, wherein the first source device ID is an application network layer server device ID.

14. The method of claim 12, wherein the client device ID is a media access control (MAC) address of the client device.

15. The method of claim 10, further comprising:
generating a first routing policy instructing the relay computing device to route communications addressed to a client device ID through the first interface; and
generating a second routing policy instructing the relay computing device to route communications addressed to a device ID of the network router through the second interface.

16. The method of claim 10, wherein the RS request prompts the network router to generate a Router Advertisement response immediately.

17. A relay computing device comprising:
a first interface configured to communicate with a first device;
a second interface configured to communicate with a second device;
a memory configured to store a transaction table including a lookup key and a corresponding request identifier (ID); and
a processor in communication with the memory, the processor configured to:
receive a plurality of data packets from the second device;
identify a plurality of IPv6 data packets among the plurality of data packets;
responsive to determining that one or more IPv6 data packets of the plurality of IPv6 data packets comprise an internet control message protocol version 6 (ICMPv6) message, perform a stateless address auto configuration (SLAAC) for the first device;
perform a neighbor discovery (ND) process with the first device; and
send, to the first device, the plurality of the IPv6 data packets, wherein, to perform the ND process, the processor is further configured to:
receive, from the first device, an IPv6 address for the first device, wherein the IPv6 address for the first device is based on a network prefix contained in a response from the second device;
receive, from the first device, a neighbor solicitation request;
relay, to the second device, the neighbor solicitation request;
receive, from the second device, a neighbor advertisement response comprising a link-layer address of the second device;
replace the link-layer address of the second device with a link-layer address of the relay computing device; and
relay, to the first device, the neighbor advertisement response comprising the link-layer address of the relay computing device.

18. The relay computing device of claim 17, wherein the first device is a client device and the second device is a network router, wherein, to perform the SLAAC, the processor is further configured to:
receive, from the client device, a router solicitation (RS) request;
relay, to the network router, the RS request;
receive, from the network router, a router advertisement (RA) response comprising the link-layer address of the network router;
replace the link-layer address of the network router in the RA response with the link-layer address of the relay computing device to generate a modified RA response; and
relay, to the client device, the modified RA response.

19. The relay computing device of claim 17, wherein the first device is a client device and the second device is a network router, wherein the processor is further configured to:
receive a multicast packet request, the multicast packet request including a client device ID as a first source device ID and including an IP address of a multicast address as a destination IP address;
send the multicast packet request to the network router;
receive a multicast packet response from the network router; and
send the multicast packet response to the client device.

* * * * *